United States Patent
Tatebe et al.

(10) Patent No.: US 8,260,754 B2
(45) Date of Patent: Sep. 4, 2012

(54) COMPUTER SYSTEM AND RESTORATION METHOD

(75) Inventors: Ayako Tatebe, Yokohama (JP); Shogo Mitsui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 12/844,518

(22) Filed: Jul. 27, 2010

(65) Prior Publication Data
US 2011/0295809 A1 Dec. 1, 2011

(30) Foreign Application Priority Data
May 27, 2010 (JP) ................................ 2010-121726

(51) Int. Cl.
*G06F 7/00* (2006.01)
*G06F 17/00* (2006.01)
(52) U.S. Cl. ..................... 707/675; 707/679; 707/681
(58) Field of Classification Search .................. 707/679, 707/680, 681, 675
See application file for complete search history.

(56) References Cited

U.S. PATENT DOCUMENTS

| 7,107,486 B2 | 9/2006 | Okada et al. |
| 7,650,356 B2 * | 1/2010 | Raheem ........................ 707/679 |
| 7,657,583 B2 * | 2/2010 | Erdmenger et al. .......... 707/674 |

FOREIGN PATENT DOCUMENTS
JP 2005-301497 10/2005
* cited by examiner

*Primary Examiner* — Vincent Boccio
(74) *Attorney, Agent, or Firm* — Foley & Lardner LLP

(57) ABSTRACT

A computer system and restoration method that can facilitate restoration work is suggested.

A management server collects necessary information from at least a business server, a storage apparatus with a primary volume formed therein, and a storage apparatus with a secondary volume formed therein; calculates, in response to a restoration request given externally, restoration time required for execution of requested restoration processing by each of a plurality of types of predetermined restoration methods based on the information collected by an information collecting unit; decides a restoration method with the shortest restoration time to be the restoration method for the restoration processing to be executed in response to the restoration request; and notifies the business server of the decided restoration method. Then, the business server controls the storage apparatus with the primary volume formed therein and the storage apparatus with the secondary volume formed therein so that the restoration processing will be executed by the restoration method of which the business server has been notified by the management server.

6 Claims, 15 Drawing Sheets

| # | AMOUNT OF DATA TO BE RESTORED | SIZE COMPARISON | AMOUNT OF DATA NOT TO BE RESTORED | TRANSFER TIME AND FEASIBILITY | | |
|---|---|---|---|---|---|---|
| | | | | VOLUME-BASED COPYING METHOD | FILE-BASED COPYING METHOD | COMBINED COPYING METHOD |
| 1 | 400MB | > | 100MB | --- (CANNOT BE APPLIED BECAUSE DATA NOT TO BE RESTORED EXISTS) | 40 Sec | 24 Sec |
| 2 | 100MB | < | 400MB | | 10 Sec | 81 Sec |
| 3 | 500MB | > | 0MB | 5 Sec | 50 Sec | 5 Sec (SINCE THERE IS NO DATA NOT TO BE RESTORED, THE SAME TRANSFER TIME AS THAT OF METHOD ①) |
| 4 | 0MB | — | 500MB | (SINCE THERE IS NO DATA TO BE RESTORED, RESTORATION WILL NOT BE PERFORMED) | | |

FIG.5

| # | INFORMATION |
|---|---|
| 1 | INFORMATION ABOUT FILES TO BE RESTORED AND FILES NOT TO BE RESTORED |
| 2 | DATA TRANSFER SPEED BETWEEN PVOL AND SVOL (DIFFERENTIAL COPYING) |
| 3 | DATA TRANSFER SPEED BETWEEN PVOL AND SVOL (FILE COPYING) |
| 4 | DATA TRANSFER SPEED BETWEEN PVOL AND SAVOL |
| 5 | TOTAL AMOUNT OF DATA TO BE BACKED UP (FILE SIZE) |
| 6 | BITMAP DIFFERENTIAL AMOUNT |
| 7 | DIFFERENTIAL RATE (DATA UPDATE RATE OF EACH FILE) |

FIG. 8

| FILE NAME | PAIR NAME | BACKUP ID | DATA AMOUNT | UPDATED DATA AMOUNT | RESTORATION OBJECT INFORMATION |
|---|---|---|---|---|---|
| File A | Pair_001 | 001 | ○○○ | × | Y |
| File B | Pair_001 | 001 | △△△△ | ○○ | N |
| File C | Pair_001 | 001 | ××××× | △△△△ | Y |
| File D | Pair_002 | 002 | ○○×× | ×× | Y |
| File E | Pair_002 | 002 | ○△△○ | △○ | N |
| 60A | 60B | 60C | 60D | 60E | 60F |

| PAIR NAME | VOLUME DIFFERENTIAL AMOUNT | BITMAP DIFFERENTIAL TRANSFER SPEED (BETWEEN PVOL AND SVOL) | FILE TRANSFER SPEED (BETWEEN PVOL AND SVOL) | FILE TRANSFER SPEED (BETWEEN PVOL AND SAVOL) |
|---|---|---|---|---|
| Pair_001 | ○○○○ | ○○ | × × × | △△△△ |
| Pair_002 | ○○△△ | △△△ | ○ × | null |
| 61A | 61B | 61C | 61D | 61E |

| SAVE VOLUME | BUSINESS SERVER |
|---|---|
| C:¥backup | Server A |
| D:¥backup | Server B |
| 62A | 62B |

62

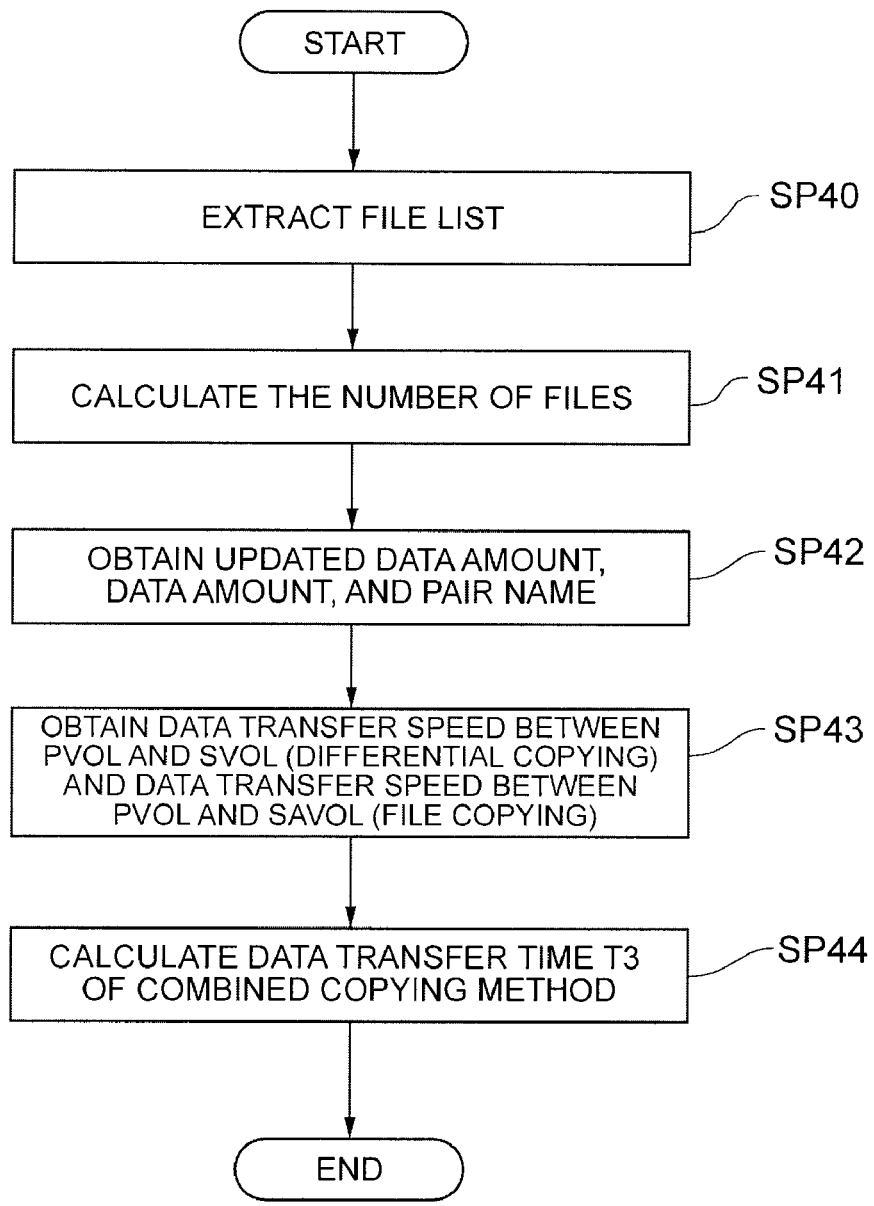

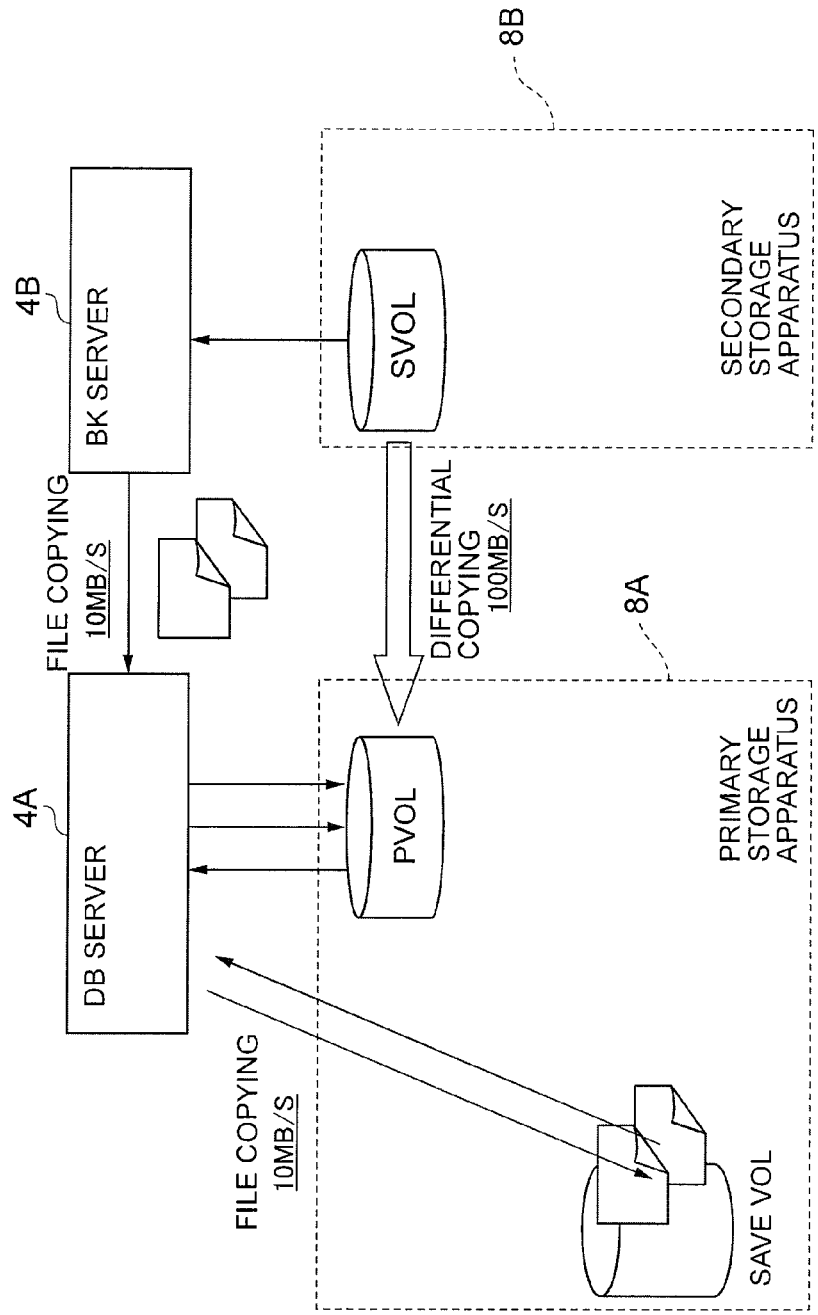

FIG.17

| # | AMOUNT OF DATA TO BE RESTORED | SIZE COMPARISON | AMOUNT OF DATA NOT TO BE RESTORED | TRANSFER TIME AND FEASIBILITY | | |
|---|---|---|---|---|---|---|
| | | | | VOLUME-BASED COPYING METHOD | FILE-BASED COPYING METHOD | COMBINED COPYING METHOD |
| 1 | 400MB | > | 100MB | --- (CANNOT BE APPLIED BECAUSE DATA NOT TO BE RESTORED EXISTS) | 40 Sec | 24 Sec |
| 2 | 100MB | < | 400MB | | 10 Sec | 81 Sec |
| 3 | 500MB | > | 0MB | 5 Sec | 50 Sec | 5 Sec (SINCE THERE IS NO DATA NOT TO BE RESTORED, THE SAME TRANSFER TIME AS THAT OF METHOD ①) |
| 4 | 0MB | --- | 500MB | (SINCE THERE IS NO DATA TO BE RESTORED, RESTORATION WILL NOT BE PERFORMED) | | |

COMPUTER SYSTEM AND RESTORATION METHOD

CROSS-REFERENCES TO RELATED APPLICATIONS

This application relates to and claims priority from Japanese Patent Application No. 2010-127726, filed on May 27, 2010, the entire disclosure of which is incorporated herein by reference.

BACKGROUND

1. Field of the Invention

The invention relates to a computer system and a restoration method and is suited for use in, for example, a computer system equipped with a storage apparatus having a backup function and a restoration function.

2. Description of Related Art

Currently, data backups using a remote copy technique are widely employed particularly in large companies' and the government's computer systems in order to protect data from data destruction caused by large-scale natural disasters such as earthquakes or hurricanes, human-caused disasters such as system administrators' operation mistakes or terrorism attacks, and equipment and program failures.

By setting a logical volume (hereinafter referred to as the "primary volume) in a primary-side storage apparatus (hereinafter referred to as the "primary storage apparatus") and a copy destination logical volume (hereinafter referred to as the "secondary volume") in a secondary-side storage apparatus (hereinafter referred to as the "secondary storage apparatus") to form a copy pair in this type of computer system, data written to the primary volume is transferred to the secondary storage apparatus in synchronization with or out of synchronization with writing of the data to the primary volume. Then, at the secondary storage apparatus, the data transferred from the primary storage apparatus is written to the same position in the secondary volume as that in the primary volume.

If data in the primary volume of such a computer system is lost or destroyed due to natural disasters or human-caused disasters, it is possible to restore the primary volume to the state before the data loss or destruction by copying data of necessary files in snapshots stored in the secondary volume to the primary volume.

If this type of computer system is used, it is possible to duplicate data and retain dual pieces of data, and prevent data loss due to, for example, disasters.

As conventional restoration methods for such a computer system, there are a volume-based copying method for copying data of files to be restored from the secondary volume to the primary volume on a volume basis and a file-based copying method for copying snapshot data from the secondary volume to the primary volume on a file basis.

The volume-based copying method is a method of differential copying of data in all the files in the secondary volume from the secondary volume to the primary volume on a volume basis. Since the entire content of the primary volume is overwritten by this restoration method, this method cannot be used when there are files not to be restored. However, since data is directly transferred from the secondary storage apparatus to the primary storage apparatus by this method, a data transfer speed is fast.

The file-based copying method is a method of differential copying of data from the secondary volume to the primary volume on a file basis. This restoration method is effective when there are files not to be restored. However, since individual files are transferred via an external server from the secondary storage apparatus to the primary storage apparatus by this method, a data transfer speed is slow.

Both the volume-based copying method and the file-based copying method have advantages and disadvantages, respectively. So, when restoring data, users need to judge which restoration method should be used, depending on an object to be restored. Therefore, the problem is that making such a judgment requires time and effort; and if the user mistakenly makes a bad judgment, restoration work will require extra time.

Incidentally, Japanese Patent Application Laid-Open (Kokai) Publication No. 2005-301497 discloses a restoration method technique capable of restoring data at a high speed. However, there is a demand for a restoration technique that can utilize more functions of existing computer systems and can be implemented by a slight change of programs.

SUMMARY

The present invention was devised in consideration of the circumstances described above and aims at suggesting a computer system and restoration method capable of facilitating restoration work.

In order to solve the above-described problems, a computer system with a primary volume, from or to which a business server reads or writes data, and a secondary volume for backing up data written to the primary volume being provided in the same storage apparatus or different storage apparatuses is provided according to an aspect of the invention, wherein the computer system includes a management server for managing a data backup and restoration between the primary volume and the secondary volume. The management server includes: an information collecting unit for collecting necessary information from at least the business server, the storage apparatus with the primary volume formed therein, and the storage apparatus with the secondary volume formed therein; a restoration method deciding unit for, in response to a restoration request given externally, calculating restoration time required for execution of requested restoration processing by each of a plurality of types of predetermined restoration methods based on the information collected by the information collecting unit, and deciding a restoration method with the shortest restoration time to be the restoration method for the restoration processing to be executed in response to the restoration request; and a storage management unit for notifying the business server of the restoration method decided by the restoration method deciding unit; and wherein the business server controls the storage apparatus with the primary volume formed therein and the storage apparatus with the secondary volume formed therein so that the restoration processing will be executed by the restoration method of which the business server has been notified by the storage management unit.

Furthermore, a restoration method for a computer system with a primary volume, from or to which a business server reads or writes data, and a secondary volume for backing up data written to the primary volume being provided in the same storage apparatus or different storage apparatuses is provided according to another aspect of the invention, wherein the computer system includes a management server for managing a data backup and restoration between the primary volume and the secondary volume. The restoration method includes: a first step executed by the management server of collecting necessary information from at least the business server, the storage apparatus with the primary volume formed therein, and the storage apparatus with the secondary volume formed therein; a second step executed by the management server of, in response to a restoration request given externally, calculating restoration time required for execution of requested restoration processing by each of a plurality of types of predetermined restoration methods based on the collected information, and deciding a restoration method with the shortest restoration time to be the restoration method for the restoration processing to be executed in response to the restoration request; a third step executed by the management server of notifying the business server of the decided restoration method; and a fourth step executed by the business server of controlling the storage apparatus with the primary volume formed therein and the storage apparatus with the secondary volume formed therein so that the restoration processing will be executed by the restoration method of which the business server has been notified by the management server.

When executing restoration according to this invention, users do not have to judge which restoration method should be used to execute restoration, and it is possible to save time and effort to make such a judgment. Accordingly, it is possible to facilitate restoration work.

BRIEF DESCRIPTION OF THE DRAWINGS

FIG. 5 is a chart explaining restoration method deciding information.

FIG. 8 is a conceptual diagram showing the configuration of a file information table.

FIG. 9 is a conceptual diagram showing the configuration of a differential amount—transfer speed table.

FIG. 10 is a conceptual diagram showing the configuration of a save volume table.

FIG. 15 is a flowchart illustrating a processing sequence for third data transfer time calculation processing.

FIG. 16 is a conceptual diagram explaining a specific example of the restoration method deciding processing based on a restoration control function according to this embodiment.

FIG. 17 is a conceptual diagram explaining a specific example of the restoration method deciding processing based on the restoration control function according to this embodiment.

DETAILED DESCRIPTION OF PREFERRED EMBODIMENTS

An embodiment of the present invention will be explained with reference to the attached drawings.

(1) Configuration of Computer System According to this Embodiment

Figure 1:
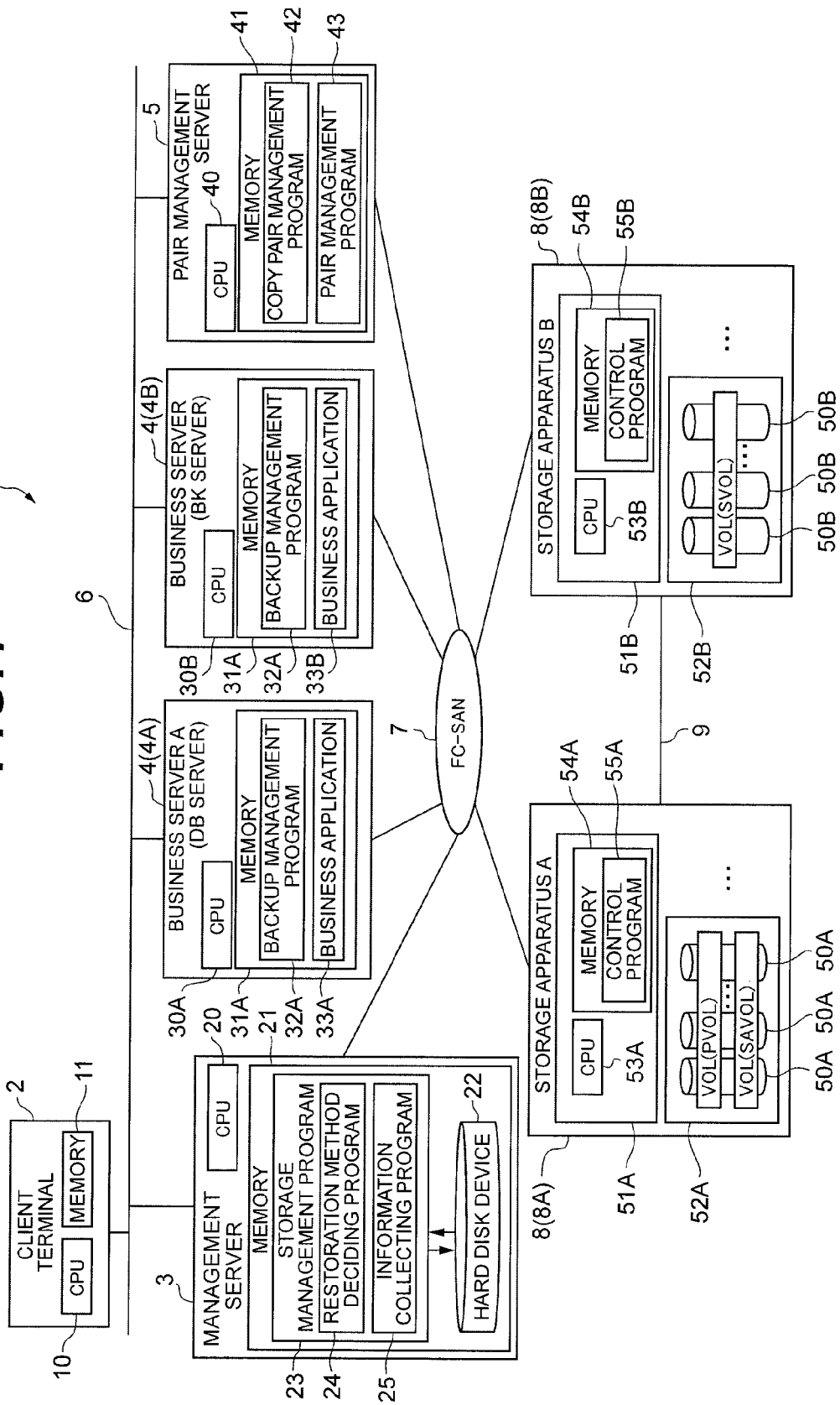
FIG. 1 is a block diagram showing the overall configuration of a computer system according to an embodiment of this invention.

A reference numeral "1" in FIG. 1 represents a computer system according to this embodiment as a whole. This computer system 1 includes a client terminal 2, a management server 3, business servers 4A, 4B, and a pair management server 5, all of which are connected to each other via a LAN (Local Area Network) 6. Furthermore, the management server 3, the business servers 4, and the pair management server 5 are connected via an FC-SAN (Fibre Channel-Storage Area Network) 7 to a primary storage apparatus 8A and a secondary storage apparatus 8B; and the primary storage apparatus 8A and the secondary storage apparatus 8B are connected to each other via a network 9. Incidentally, if it is particularly unnecessary to distinguish between the primary storage apparatus 8A and the secondary storage apparatus 8B in the following explanation, the primary storage apparatus 8A and the secondary storage apparatus 8B will be collectively referred to as the storage apparatus 8.

The client terminal 2 is a terminal device used to manage replications to be backed up (snapshots in this case) which are created in the secondary storage apparatus 8B by remote copying between the primary storage apparatus 8A and the secondary storage apparatus 8B as described later; and is composed of, for example, a personal computer. The client terminal 2 includes information processing resources such as a CPU (Central Processing Unit) 10 and a memory 11, as well as information input devices (not shown in the drawings) such as a keyboard, a switch, a pointing device and/or a microphone, and information output devices (not shown in the drawings) such as a monitor display and/or a speaker. As the CPU 10 executes programs stored in the memory 11, various processing is executed as the whole client terminal 2.

The management server 3 is a computer device used to manage the storage apparatus 8 connected to the FC-SAN 7 and includes, for example, a CPU 20, a memory 21, a hard disk device 22, information input devices (not shown in the drawings), and the information output devices (not shown in the drawings). The management server 3 also manages data backups and restoration between the primary storage apparatus 8A and the secondary storage apparatus 8B.

The memory 21 for the management server 3 stores a storage management program 23. The storage management program 23 is a program for managing the configuration of each storage apparatus 8 connected to the FC-SAN 7; and displays various pieces of information obtained from the storage apparatus 8 on the information output device and operates the storage apparatus 8 in accordance with instructions input by a user via the information input devices.

The hard disk device 22 is used mainly to store various programs and various data. Various programs stored in the hard disk device 22 (including a storage management program 23) are loaded into the memory 21 and executed by the CPU 21.

The business server 4 is a server device for performing user business activities and includes information processing resources such as a CPU 30A, 30B and a memory 31A, 31B. A business application 33A, 33B used for the user business activities operates on the business server 4 and data used by the business application 33A, 33B (for example, data of a database) is read or written as files via the FC-SAN 7 from or to the corresponding primary volume PVOL in the primary storage apparatus 8A. FIG. 1 shows a configuration example in which one business application 33A, 33B operates on each business server 4; however, a plurality of business applications 33A, 33B may operate on the business server 4.

A backup management program 32A, 32B also operates on the business server 4. The backup management program 32A, 32B communicates with the business application 33A, 33B and the pair management server 5 in response to a request from the client terminal 2; and when the need arises, the backup management program 32A, 32B controls the primary storage apparatus 8A and the secondary storage apparatus 8B so that the business application 33A, 33B performs remote copying (backup) of data stored in the primary volume PVOL in the primary storage apparatus 8A to the corresponding secondary volume SVOL in the secondary storage apparatus 8B. The backup management program 32A, 32B provides an information collecting program 25 described later with various pieces of information about the business server 4 and the business application 33A, 33B in response to a request from the information collecting program 25 for the management server 3.

Incidentally, in this embodiment, a database server 4A and a backup server 4B are provided as the business server 4. The database server 4A is a server for mainly performing the user business activities and is connected to the primary storage apparatus 8A. The business application 33A and a database for performing the user business activities operate on this database server 4A.

The backup server 4B is a server for mainly managing data backups from the primary volume PVOL to the secondary volume SVOL as described above. It should be noted that the backup server 4B is needed when data backed up to the secondary storage apparatus 8B is further stored in a magnetic tape or similar or when reference is made to the content of data backed up to the secondary storage apparatus 8B; but the backup server 4B can be omitted if it is unnecessary to perform the above-described operations.

The pair management server 5 is a server device for managing a copy pair of the primary volume PVOL in the primary storage apparatus 8A, from or to which the business server 4 reads or writes data, and the secondary volume SVOL created in the secondary storage apparatus 8B; and includes information processing resources such as a CPU 40 and a memory 41. The "copy pair" herein used means a pair of the primary volume PVOL and the secondary volume SVOL that is set to copy data, which is written to the primary volume PVOL, to the secondary volume SVOL.

The memory 41 for the pair management server 5 stores a copy pair management program 42 and a pair management program 43. The copy pair management program 42 controls the primary storage apparatus 8A and the secondary storage apparatus 8B to create, delete, or change the state of, a copy pair(s) as operated by the user. The copy pair management program 42 also provides the information collecting program 25 with various pieces of information about the created copy pair(s) in response to a request from the information collecting program 25 described later for the management server 3.

Each storage apparatus 8 includes a plurality of physical disks 50A, 50B and a controller 51A, 51B for controlling reading data from, or writing data to, the physical disks 50A, 50B.

The physical disks 50A, 50B are composed of expensive disks such as SCSI (Small Computer System Interface) disks or inexpensive disks such as SATA (Serial AT Attachment) disks or optical disks.

Each physical disk 50A, 50B is operated by the controller 51A, 51B according to a RAID (Redundant Arrays of Independent Disks) system. One or more physical disks 50A, 50B constitute a RAID group 52A, 52B and one or more logical volumes VOL are set to storage areas provided by the physical disks 50A, 50B constituting one RAID group 52A, 52B. Data is stored in specified-sized blocks (hereinafter referred to as the "logical blocks") or files in the logical volume(s) VOL.

Each logical volume VOL is given a unique identifier (hereinafter referred to as the LUN (Logical Unit number)). In this embodiment, data is input to, or output from, the logical volume VOL by designating an address that is a combination of the LUN and a unique number of the relevant logical block (LBA: Logical Block Address) which is given to each logical block.

Incidentally, in this embodiment, there are three types of attributes of the logical volume(s) VOL created in the primary storage apparatus 8A and the secondary storage apparatus 8B: the primary volume PVOL and the secondary volume SVOL described above, and a save volume SAVOL.

The primary volume PVOL is a logical volume used by the business application 33A, 33B for the business server 4 to read or write data as described earlier and is created in the primary storage apparatus 8A.

The secondary volume SVOL is a logical volume storing backup data (data that has been remote-copied from the primary volume PVOL) of files stored in the primary volume PVOL and is created in the secondary storage apparatus 8B. However, the secondary volume SVOL may be created in the same storage apparatus 8 as that of the primary volume PVOL. When a copy pair of the primary volume PVOL and the secondary volume SVOL is split (break of remote copying) in response to a request from the backup management program 32A, 32B for the business server 4, a data image of the primary volume PVOL at the time of split is stored in the secondary volume SVOL.

The save volume SAVOL is a logical volume for temporarily saving data of files, which are stored in the primary volume PVOL and are not to be restored, when a combined copying method described later is adopted as the restoration method for the restoration processing. FIG. 1 shows that the save volume SAVOL is provided in the primary storage apparatus 8A; however, the save volume SAVOL may be provided in the secondary storage apparatus 8B or in a storage area of any other storage apparatus or some server device and the location of the save volume SAVOL is not limited to inside the primary storage apparatus 8A.

The controller 51 includes a CPU 53A, 53B and a memory 54A, 54B. The CPU 53A, 53B is a processor for controlling the operation of the entire storage apparatus 8. The memory 54A, 54B stores various types of control program 55A, 55B. The control program 55A, 55B performs various operations on copy pairs in response to a request from the management server 3, the business server 4, or the pair management server 5 and provides various pieces of information recorded in storage areas of the storage apparatus 8.

For example, when data is written by the business application 33A, 33B for the business server 4A, 4B to the primary volume PVOL, the control program 55A for the primary storage apparatus 8A transfers the data to the secondary storage apparatus 8B in synchronization with or out of synchronization with writing of that data. The control program 55B for the secondary storage apparatus 8B writes the data to the corresponding position in the corresponding secondary volume in the secondary storage apparatus 8B. Subsequently, after receiving a split request designating a copy pair from the business server 4 as operated by the user, the control program 55A for the primary storage apparatus 8A stops transfer of the data, which was written to the primary volume PVOL, to the secondary storage apparatus 8B. As a result, a snapshot that is a static data image of the primary volume PVOL at the time of reception of the slit request from the business server 4 by the primary storage apparatus 8A is created in the secondary volume SVOL.

(2) Restoration Control Function

Next, a restoration control function of the management server 3 according to this embodiment will be explained. Firstly, restoration methods that can be executed in this computer system 1 will be explained.

(2-1) Restoration Methods in this Computer System

In the case of this computer system 1, there are three restoration methods for restoring data stored in the primary volume PVOL in the primary storage apparatus 8A, using data stored in the secondary volume SVOL in the secondary storage apparatus 8B: a volume-based copying method, a file-based copying method, and a combined copying method which is a combination of the above two restoration methods.

Figure 2:
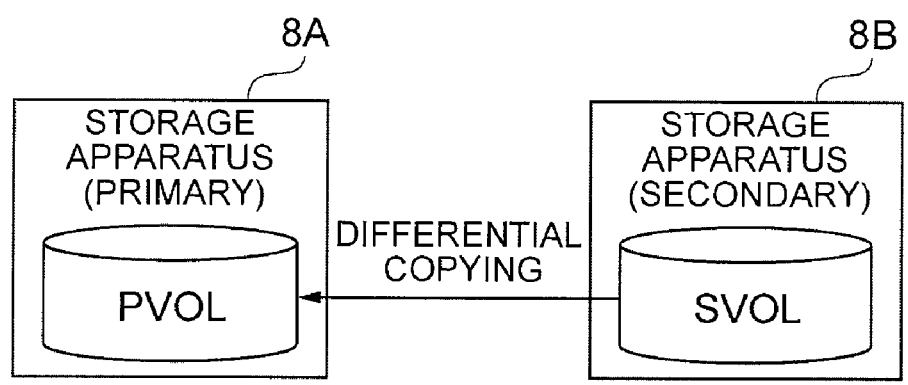
FIG. 2 is a conceptual diagram explaining a volume-based copying method.

The volume-based copying method is a method by which the secondary storage apparatus 8B performs differential copying of data in the secondary volume SVOL on a volume basis to the primary volume PVOL in the primary storage apparatus 8A via the network 9 as shown in FIG. 2. The total data transfer amount by this the volume-based copying method is equal to the total file size of all the files stored in the secondary volume SVOL. Since the entire content of the primary volume PVOL is overwritten by this volume-based copying method, if there are files not to be restored, the volume-based copying method cannot be used. However, since a data transfer speed of the volume-based copying method is significantly higher than that of the file-based copying method, the volume-based copying method can be recognized to be the most efficient restoration method when files not to be restored do not exist or when files not to be restored exist, but have not been updated (when a differential rate is "0").

Incidentally, differential copying is a copy method by which after preparing a bitmap having bits associated respectively with logical blocks of the secondary volume SVOL and setting all the bits in that bitmap table to "1," data in the secondary volume SVOL is copied on a logical block basis via the network 9 to the same address position in the primary volume PVOL as that in the secondary volume SVOL (the relevant data in the primary volume PVOL is overwritten with the data copied from the secondary volume SVOL). In this case, the bits in the bitmap table corresponding to the logical blocks for which data copying has been performed are updated to "0." So, data copying is continuously performed until all the bits are updated to "0."

Figure 3:
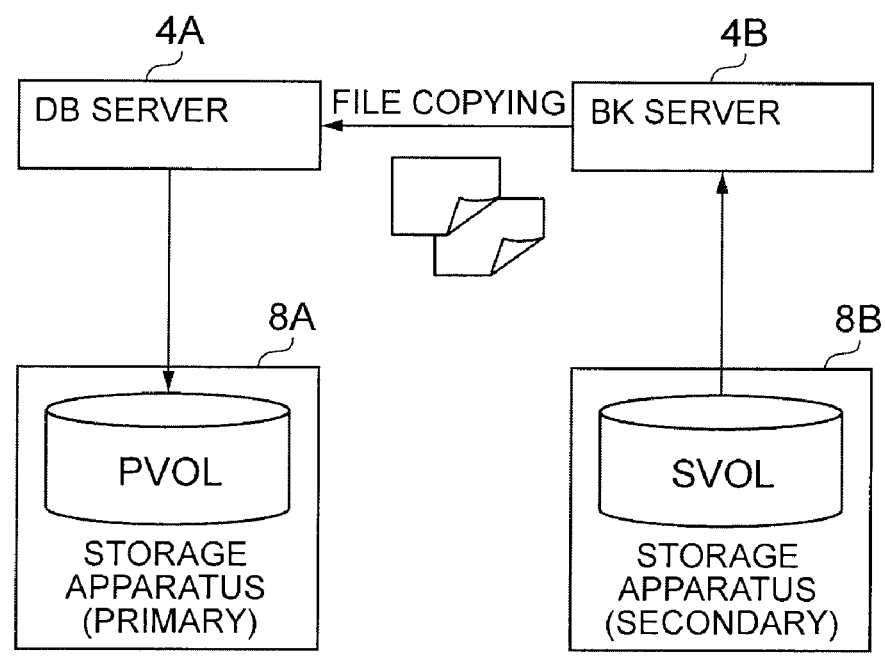
FIG. 3 is a conceptual diagram explaining a file-based copying method.

The file-based copying method is a method of copying files in the secondary volume SVOL, which are selected by the user and are to be restored, to the primary volume PVOL via the backup server 4B and the database server 4A as shown in FIG. 3 (the relevant data in the primary volume PVOL is overwritten with the data copied from the secondary volume SVOL). The total data transfer amount by this file-based copying method is equal to the total file size of each file to be restored. This file-based copying method is an effective restoration method when files not to be restored exist and the total data amount of such files not to be restored is large. This is because it is just necessary to copy only a small amount of files to be restored, so that the restoration time can be reduced.

Figure 4:
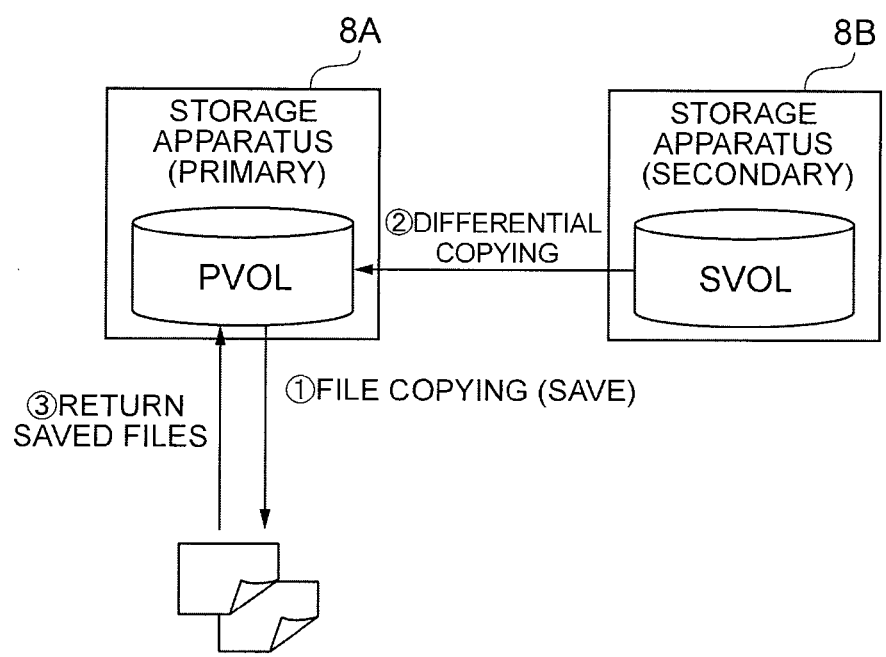
FIG. 4 is a conceptual diagram explaining a combined copying method.

Furthermore, the combined copying method is a method of temporarily saving files, which are stored in the primary volume PVOL and are not to be restored, in the save volume SAVOL, then performing differential copying of data from the secondary volume SVOL to the primary volume PVOL on a volume basis, and finally returning the files, which have been saved in the save volume SAVOL, to the primary volume PVOL as shown in FIG. 4. The total data transfer amount by this combined copying method is equal to a value obtained by adding the total file size of all the files stored in the secondary volume SVOL and twice as much as the total file size of the files which are not to be stored and saved in the save volume SAVOL. This combined copying method is effective when the files not to be restored exist and the total data amount of such files not to be restored is small.

In the case of the computer system 1 according to this embodiment, one of its characteristics is that the management server 3 is equipped with a restoration control function that selects and decides an optimum restoration method for the restoration processing to be then executed from among the three restoration methods, notifies the business server 4 of the decided restoration method, and thereby controls the primary storage apparatus 8A and the secondary storage apparatus 8B to have the business server 4 execute the restoration processing by that restoration method.

In fact, the management server 3 collects, in advance, necessary information such as data transfer speeds when executing file copying and differential copying between the primary storage apparatus 8A and the secondary storage apparatus 8B (hereinafter referred to as the "restoration method deciding information"); selects any one of the volume-based copying method, the file-based copying method, and the combined copying method as the restoration method to be then executed, based on the collected restoration method deciding information at the time of execution of restoration; and controls the business server 4 to execute the restoration processing by the selected restoration method.

In this case, the management server 3 periodically obtains, as the restoration method deciding information from among various pieces of information which is shown in FIG. 5 and required when executing restoration method deciding processing described later, a data transfer speed for differential copying between the primary volume PVOL and the secondary volume SVOL ("#2"), a data transfer speed for file copying between the primary volume PVOL and the secondary volume SVOL ("#3"), a data transfer speed for file copying between the primary volume PVOL and the save volume SAVOL ("#4"), and the total amount of data to be backed up (total file size) ("#5"), and the data amount and updated data amount of each file.

Incidentally, of the information "#2" to "#4," the information "#2" is information obtained and managed by the control program 55A, 55B for the storage apparatus 8 (FIG. 1) at the time of, for example, execution of differential copying between the primary volume PVOL and the secondary volume SVOL; and the information "#3" and "#4" is information obtained and managed by the backup management program 32A, 32B for the business server 4 (FIG. 1) at the time of, for example, execution of file-based copying between the primary volume PVOL and the secondary volume SVOL or between the primary volume PVOL and the save volume SAVOL.

Then, after receiving a restoration execution command from the client terminal 2 as operated by the user, the management server 3 calculates a differential rate of each file to be restored (which is a data update rate of each file and information "#7" in FIG. 5) based on the data amount and updated data amount of each file, which are collected periodically as described earlier; and obtains an differential amount between the primary volume PVOL and the secondary volume SVOL ("#6") from the storage apparatus 8.

The management server 3 calculates data transfer time (restoration time) when copying the files to be restored from the secondary volume SVOL to the primary volume PVOL by each of the volume-based copying method, the file-based copying method, and the combined copying method, based on the restoration method deciding information obtained as described above; and decides the restoration method with the shortest data transfer time to be the restoration method to be then executed. A specific method for calculating the data transfer time by the volume-based copying method, the file-based copying method, and the combined copying method will be explained later. The management server 3 then notifies the business server 4 of the restoration method decided as described above.

The backup management program 32A, 32B for the business server 4 which has received the above notice (hereinafter referred to as the "restoration method designating notice") controls the primary storage apparatus 8A and the secondary storage apparatus 8B to execute restoration by the restoration method designated by this restoration method designating notice.

(2-2) Data Transfer Time Calculation Method

Now, a method for calculating the data transfer time required to execute the restoration processing by the volume-based copying method, the file-based copying method, and the combined copying method will be explained.

Firstly, "$n_1$" represents the number of files to be restored; "$n_2$" represents the number of files not to be restored; "P" represents a proportion of the total file size of the files not to be restored to the total file size of all the files stored in the secondary volume SVOL; and "Pm" represents a threshold for P to decide the restoration method. Furthermore, "$S_1$" represents a data transfer speed for transferring differential data between the primary volume PVOL and the secondary volume SVOL; "$S_2$" represents a data transfer speed for transferring file data between the primary volume PVOL and the secondary volume SVOL; "$S_3$" represents a data transfer speed for transferring data between the primary volume PVOL and the save volume SAVOL; "α" represents a ratio of the data transfer speed for transferring differential data between the primary volume PVOL and the secondary volume SVOL to the data transfer speed for transferring file data between the primary volume PVOL and the secondary volume SVOL; "β" represents a ratio of the data transfer speed for transferring data between the primary volume PVOL and the save volume SAVOL to the data transfer speed for transferring file data between the primary volume PVOL and the secondary volume SVOL; "T" represents the total file size of all the files to be backed up; and "k" represents a data update rate (differential rate) of each file stored in the primary volume PVOL (0<k<1).

In this case, the proportion P is a value larger than "0" and smaller than "1" (0<P<1) and can be expressed in the following formula:

[Formula 1]

$$P = \frac{n_2}{n_1 + n_2} \quad (1)$$

Assuming that the file size of each file is "f" for ease of explanation, the total file size T can be expressed in the following formula:

[Formula 2]

$$T = f(n_1 + n_2) \quad (2)$$

The data transfer speed $S_2$ for transferring file data between the primary volume PVOL and the secondary volume SVOL is normally slower than the data transfer speed $S_1$ for transferring differential data between the primary volume PVOL and the secondary volume SVOL or the data transfer speed $S_3$ for transferring data between the primary volume PVOL and the save volume SAVOL. So, assuming that the data transfer speed $S_2$ is slower than data transfer speed $S_1$ or the data transfer speed $S_3$ in the following case, both the ratio α and the ratio β are larger than "1" (α>1, β>1), and $S_1$ can be expressed in formula 3 and $S_3$ can be expressed in formula 4 as follows:

[Formula 3]

$$S_1 = \alpha \times S_2 \quad (3)$$

[Formula 4]

$$S_3 = \beta \times S_2 \quad (4)$$

Therefore, the data transfer time $T_1$ when copying the files to be restored from the secondary volume SVOL to the primary volume PVOL by the volume-based copying method can be expressed in the following formula:

[Formula 5]

$$T_1 = \frac{kT}{S_1} = \frac{k(n_1 + n_2)f}{\alpha S_2} \quad (5)$$

The data transfer time $T_2$ when copying the files to be restored from the secondary volume SVOL to the primary volume PVOL by the file-based copying method can be expressed in the following formula:

[Formula 6]

$$T_2 = \frac{n_1 f}{S_2} \quad (6)$$

The data transfer time $T_3$ when copying the files to be restored from the secondary volume SVOL to the primary volume PVOL by the combined copying method can be expressed in the following formula:

[Formula 7]

$$T_3 = \frac{kT}{S_1} + \frac{2n_2 f}{S_3} = \frac{k(n_1 + n_2)f}{\alpha S_2} + \frac{2n_2 f}{\beta S_2} \quad (7)$$

Therefore, a value corresponding to the difference between the data transfer time $T_3$ when copying the files to be restored from the secondary volume SVOL to the primary volume PVOL by the combined copying method, and the data transfer time $T_2$ when copying the files to be restored from the secondary volume SVOL to the primary volume PVOL by the file-based copying method is expressed in the following formula:

[Formula 8]

$$\frac{T_3 - T_2}{(n_1 + n_2)\frac{f}{S_2}} = \left(1 + \frac{2}{\beta}\right)(P - Pm) \quad (8)$$

Accordingly, the threshold Pm (0<Pm<1) for P to decide the restoration method according to formula (8) is expressed in the following formula:

[Formula 9]

$$Pm = \frac{1 - \frac{k}{\alpha}}{1 + \frac{2}{\beta}} \quad (9)$$

Figure 6:
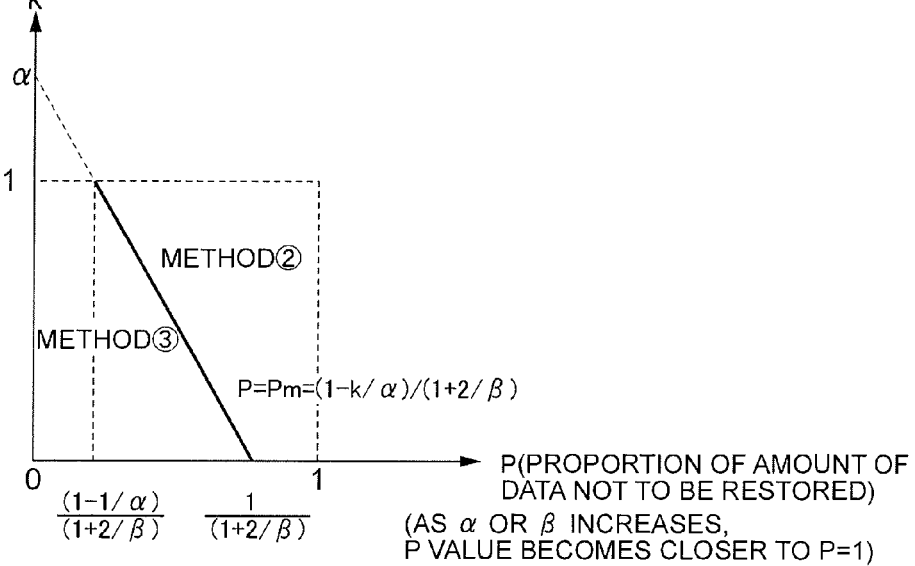
FIG. 6 is a graph explaining a method for calculating a data transfer speed.

As is apparent from formula (8), if the combined copying method is adopted as the restoration method in the case of P<Pm, the data transfer time (restoration time) will be shortened as a whole. The smaller the value k is (less data updates) or the faster the data transfer speed between the primary volume PVOL and the save volume SAVOL is, the larger the value Pm becomes. So, if the combined copying method is adopted as the restoration method, the range of P that will shorten the data transfer time expands. Incidentally, the relationship between P and k that is expressed as P−Pm<0 or P−Pm>0 is shown in FIG. 6. It should be noted that the aforementioned reference value is determined not by the data transfer speed and the size of the data amount themselves, but only by a relative ratio.

The above explanation has been given on the assumption that the file size of each file is the same value f. However, if the file size f and the differential rate k are different for each file, the total file size of the files to be restored is expressed in the following formula, where "$f_i$" represents the file size of files to be restored and "$f_j$" represents the file size of files not to be restored:

[Formula 10]

$$\sum_{i=1}^{n1} f_i = n_1 f \quad (10)$$

The total file size of the files not to be restored is expressed in the following formula:

[Formula 11]

$$\sum_{j=1}^{n2} f'_j = n_2 f \quad (11)$$

It should be noted that $n_1$, $n_2$ do not necessarily have to be the number of actual files (that is, they do not have to be integers) and the file size f may be any random value. This is because only the relative ratio of the file size is important for calculation of the selection reference value as described above.

Furthermore, the total file size of the files to be backed up can be expressed in the following formula based on formula (10) and formula (11):

[Formula 12]

$$\sum_{i=1}^{n1} f_i + \sum_{j=1}^{n2} f'_j = (n_1 + n_2)f = T \quad (12)$$

The total data amount of updated files can be expressed in the following formula:

[Formula 13]

$$\sum_{i=1}^{n1} k_i f_i + \sum_{j=1}^{n2} k'_j f'_j = kT \quad (13)$$

An average amount of the differential rate can be expressed in the following formula:

[Formula 14]

$$\left(\sum_{i=1}^{n1} k_i f_i + \sum_{j=1}^{n2} k'_j f'_j\right) / \left(\sum_{i=1}^{n1} f_i + \sum_{j=1}^{n2} f'_j\right) = (kT)/T = k \quad (14)$$

Furthermore, a proportion of the total file size of the files not to be restored to the total file size of all the files stored in the secondary volume SVOL can be expressed in the following formula:

[Formula 15]

$$\sum_{j=1}^{n2} f'_j / \left(\sum_{i=1}^{n1} f_i + \sum_{j=1}^{n2} f'_j\right) = n_2/(n_1 + n_2) = P \quad (15)$$

Therefore, even if the file size f and the differential rate k are different for each file, formulas (5) to (7) can be used without any change by replacing these values with average values (an average value of the file size and an average value of the differential rate). A standard deviation $\sigma_k$ of the differential rates (including the differential rates for files to be restored and for files not to be restored) in that case can be expressed in the following formula, assuming the file size $f_i$ of each file as weight:

[Formula 16]

$$\sigma_k = \sqrt{\left(\left(\sum_{i=1}^{n} f_i(k_i - k)^2\right) / \left(\sum_{i=1}^{n} f_i\right)\right)} = \sqrt{\left(\left(\sum_{i=1}^{n} f_i \cdot k_i^2\right) / \left(\sum_{i=1}^{n} f_i\right) - k^2\right)} \quad (16)$$

According to the above definition, it is understood that the relationship of $T_3 > T_1$ is always fulfilled. However, the above-described calculation can be used only when files not to be restored do not exist or when files not to be restored exist, but the differential amount is zero. So, the data transfer time $T_1$ when copying the files to be restored from the secondary volume SVOL to the primary volume PVOL by the volume-based copying method is compared with the data transfer time $T_2$ when copying the files to be restored from the secondary volume SVOL to the primary volume PVOL by the file-based copying method.

The difference between the two data transfer time values $T_1$ and $T_2$ can be expressed in the following formula:

[Formula 17]

$$T_1 - T_2 = \frac{k(n_1+n_2)f}{S_1} - \frac{n_1 f}{S_2} \quad (17)$$
$$= \left((n_1+n_2)\frac{f}{S_2}\right)\left(P - \left(1 - \frac{k}{\alpha}\right)\right)$$
$$= \left((n_1+n_2)\frac{f}{S_2}\right)(P - Pm_0)$$

Incidentally, "$Pm_0$" represents a threshold for P to select the restoration method.

$Pm_0$ can be found by the following formula:

[Formula 18]

$$Pm_0 = 1 - \frac{k}{\alpha} \quad (18)$$

Therefore, when the relationship of the following formula is fulfilled, that is, the larger the amount of files not to be restored is and the higher the data update rate is, $T_1$ becomes larger than $T_2$ ($T_1 > T_2$) and the data transfer time for the file-based copying method becomes shorter than the data transfer time for the volume-based copying method.

[Formula 19]

$$P > \left(1 - \frac{k}{\alpha}\right) \quad (19)$$

Figure 7:
FIG. 7 is a graph explaining a method for calculating a data transfer speed.

Incidentally, the relationship of P and k in this case which satisfies either formula 20 or formula 21 is shown in FIG. 7.

[Formula 20]

$$P - \left(1 - \frac{k}{\alpha}\right) < 0 \quad (20)$$

[Formula 21]

$$P - \left(1 - \frac{k}{\alpha}\right) > 0 \quad (21)$$

Another method for deciding the restoration method by comparing the data transfer time $T_3$ by the combined copying method with the data transfer time $T_2$ by the file-based copying method, if an average value of the differential rates is different between data of the files to be restored and data of the files not to be restored, will be explained below.

Where "$k_1$" represents an average value of the differential rates of the files to be restored and "$k_2$" represents an average value of the differential rates of the files not to be restored, the differential rate "k" of all the files can be expressed in formula 24 based on formula 22 and formula 23 as follows:

[Formula 22]

$$kT = (k_1 n_1 + k_2 n_2)f \quad (22)$$

[Formula 23]

$$T = (n_1 + n_2)f \quad (23)$$

[Formula 24]

$$k = \frac{(k_1 n_1 + k_2 n_2)f}{(n_1 + n_2)f} = k_1(1-P) + k_2 P = k_1 + (k_2 - k_1)P \quad (24)$$

Consequently, the relationship of the following formula is fulfilled:

[Formula 25]

$$\frac{1-k}{\alpha} = 1 - \frac{k_1}{\alpha} + \left(\frac{k_1 - k_2}{\alpha}\right)P \quad (25)$$

So, the differential rate k of all the files depends on the proportion P of the total file size of the files not to be restored to the total file size of all the files stored in the secondary volume SVOL.

The aforementioned Pm can be obtained by the following formula:

[Formula 26]

$$Pm = \frac{1 - k/\alpha}{1 + 2/\beta} = \frac{(1 - k_1/\alpha) + ((k_1 - k_2)/\alpha)P}{1 + 2/\beta} \quad (26)$$

So, P−Pm can be expressed in the following formula:

[Formula 27]

$$P - Pm = \left(1 - \frac{(k_1 - k_2)}{(1 + 2/\beta)\alpha}\right)(P - Pm_1) \quad (27)$$

$Pm_1$ in formula (27) is a threshold for P to select the restoration method and can be expressed in the following formula:

[Formula 28]

$$Pm_1 = \frac{1 - k_1/\alpha}{1 + 2/\beta - ((k_1 - k_2)/\alpha)} \quad (28)$$

Since the relationship of $0<k_1<1$, $0<k_2<1$, and $\alpha>1$ is fulfilled, the following formula can be obtained:

[Formula 29]

$$\left|\frac{k_1 - k_2}{\alpha}\right| < 1 \quad (29)$$

A denominator of $Pm_1$ is larger than a numerator of $Pm_1$ in formula (29), so that the relationship of $0<Pm_1<1$ is fulfilled.

Furthermore, another method for deciding the restoration method by comparing the data transfer time $T_1$ by the volume-based copying method with the data transfer time $T_2$ by the file-based copying method, if an average value of the differential rates is different between data of the files to be restored and data of the files not to be restored, will be explained below.

The relationship of the following formula can be established based on the aforementioned formula (17) and formula (25):

[Formula 30]

$$\frac{T_1 - T_2}{(n_1 + n_2)(f/S_1)} = P - \left(1 - \frac{k}{\alpha}\right) \quad (30)$$

$$= \left(1 - \frac{k_1 - k_2}{\alpha}\right)(P - Pm_2)$$

$Pm_2$ in formula (30) is a threshold for P to select the restoration method and can be expressed in the following formula:

[Formula 31]

$$Pm_2 = \frac{1 - k_1/\alpha}{1 - (k_1 - k_2)/\alpha} \quad (31)$$

As is apparent from formula (31), in a case of $k_2=0$ (when the differential rate of the files not to be restored is zero), the result will be $Pm_2=1$. So, the data transfer time $T_1$ by the volume-based copying method will be always shorter than the data transfer time $T_2$ by the file-based copying method. Also, in a case of P=0 (when the files not to be restored do not exist), the data transfer time $T_1$ by the volume-based copying method will be always shorter than the data transfer time $T_2$ by the file-based copying method.

(2-3) Configuration of Various Programs and Tables

As a means for implementing the restoration control function described above according to this embodiment, the storage management program 23 for the management server 3 includes a restoration method deciding program 24 and an information collecting program 25 as shown in FIG. 1; and the hard disk device 22 for the management server 3 stores a file information table 60 shown in FIG. 8, a differential amount—transfer speed table 61 shown in FIG. 9, and a save volume table 62 shown in FIG. 10.

The restoration method deciding program 24 is a program for deciding the restoration method for restoring data stored in the primary volume PVOL in the primary storage apparatus 8A, and the information collecting program 25 is a program for collecting information necessary for judgment of the restoration method as described later from the storage apparatus 8 and the business server 4. The information collected by the information collecting program 25 and other information obtained based on the above information are stored in, and managed by, the file information table 60, the differential amount—transfer speed table 61, and the save volume table 62.

The file information table 60 is a table for managing information such as the data amount (file size) and updated data amount of each file stored in the primary volume PVOL, which has been collected by the information collecting program 25 for the management server 3 from the control program 55A for the primary storage apparatus 8A as described above; and includes a file name column 60A, a pair name column 60B, a backup ID column 60C, a data amount column 60D, an updated data amount column 60E, and a restoration object information column 60F as shown in FIG. 8.

The file name column 60A stores a file name of each of all the files stored in the primary volume PVOL, and the pair name column 60B stores a pair name assigned to a copy pair of the primary volume PVOL, from which the relevant file is copied, and the secondary volume SVOL to which the relevant file is copied.

The backup ID column 60C stores a unique identifier (backup ID) assigned to backup processing on the relevant file (processing for remote copying from the primary volume PVOL to the secondary volume SVOL) as described later. The data amount column 60D stores the file size of the relevant file, and the updated data amount column 60E stores the amount of data updated after the relevant file was backed up last time (updated data amount).

Furthermore, the restoration object information column 60F stores information indicating whether or not the relevant file is designated as an object to be restored. Specifically speaking, the restoration object information column 60F stores "Y" if the relevant file is designated as the object to be restored; and the restoration object information column 60F stores "N" if the relevant file is not designated as the object to be restored.

The differential amount—transfer speed table 61 is a table for managing specified information relating to data transfer of each copy pair collected by the information collecting program 25 for the management server 3 from the storage apparatus 8 and the business server 4; and includes a pair name column 61A, a volume differential amount column 61B, a bitmap table differential transfer speed (between PVOL and SVOL) column 61C, a file transfer speed (between PVOL and SVOL) column 61D, and a file transfer speed (between PVOL and SAVOL) column 61E.

The pair name column 61 stores a pair name of each of all the copy pairs defined between the primary storage apparatus 8A and the secondary storage apparatus 8B, and the volume differential amount column 61B stores the data differential amount between the primary volume PVOL and the secondary volume SVOL with respect to the relevant copy pair.

The bitmap table differential transfer speed (between PVOL and SVOL) column 61B stores a data transfer speed for differential copying from the primary volume PVOL to the secondary volume SVOL with respect to the relevant copy pair, and the file transfer speed (between PVOL and SVOL) column 61C stores a data transfer speed for file copying from the primary volume PVOL to the secondary volume SVOL with respect to the relevant copy pair. The file transfer speed (between PVOL and SAVOL) column 61E stores a data transfer speed for file copying from the primary volume PVOL to the save volume SAVOL with respect to the relevant copy pair.

Furthermore, the save volume table 62 is a table for managing information about the save volume SAVOL which is set by the user; and includes a save volume column 62A and a business server column 62B as shown in FIG. 10.

The save volume column 62A stores a path name for the save volume SAVOL which is set by the user, and the business server column 62B stores an identifier (server name) of the business server 4 on which the business application 33A, 33B using data saved in the relevant save volume SAVOL is mounted.

(2-4) Flows of Various Processing Relating to Restoration Control Function According to This Embodiment Next, flows of various processing with respect to the restoration control function described above according to this embodiment will be explained.

(2-4-1) Backup and Restoration Flow

Figure 11:
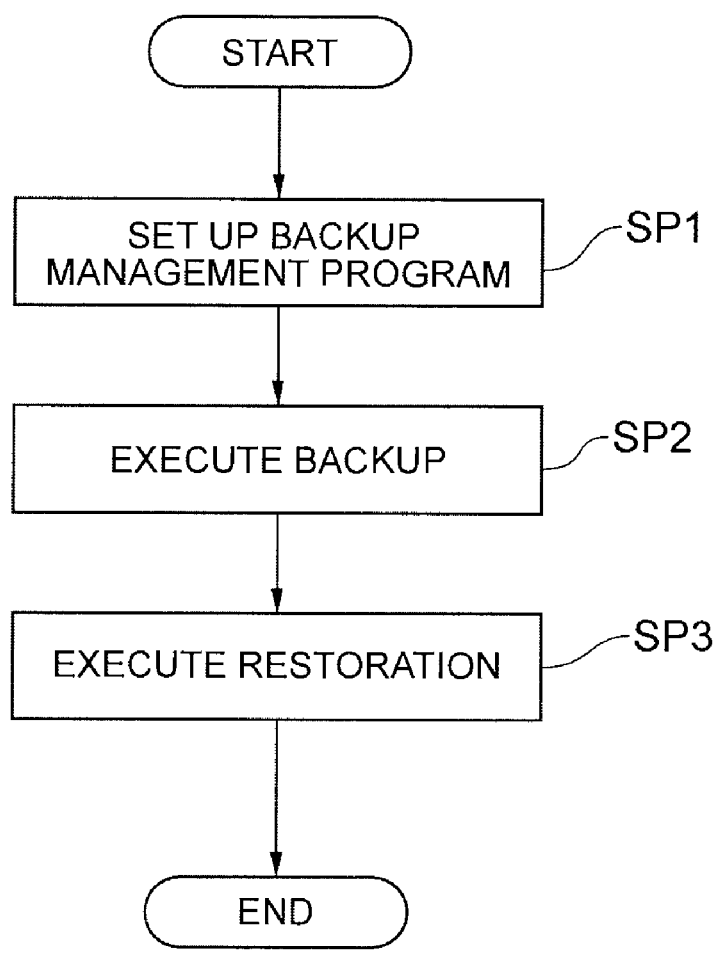
FIG. 11 is a flowchart illustrating a backup and restoration flow in the computer system according to this embodiment.

FIG. 11 shows a backup and restoration flow in this computer system 1.

When the business server 4 backs up data of files stored in the primary volume PVOL in the primary storage apparatus 8A to the corresponding secondary volume SVOL in the secondary storage apparatus 8B in this computer system 1, it firstly sets up the backup management program 32A, 32B for the business server 4 (SP1).

Specifically speaking, the user operates the management server 3 and thereby makes it display a specified setting screen; and if the business server 4 and the combined copying method as the restoration method are adopted on that setting screen, the user sets a path name for the save volume SAVOL to save files of the business server 4. The server name of the business server 4 and the path name for the save volume SAVOL which are then set are stored in the save volume table 60 (FIG. 8) by the storage management program 23 for the management server 3.

The user also selects, for the business server 4, files to be backed up from among the files stored in the primary volume PVOL by the business server 4. Subsequently, the file names of the files to be backed up as selected by the user as described above are collected by the information collecting program 25 for the management server 3 (FIG. 1) and stored in the file name column 60A in the file information table 60. Furthermore, the information collecting program 25 for the management server 3 collects the pair names of copy pairs, whose files to be backed up are to be copied, from the control program 55A, 55B for the storage apparatus 8. As a result, the pair names then collected are stored in the corresponding pair name column 60B in the file information table 60.

Subsequently, the user operates the management server 3 to have the business server 4 execute the backup processing (SP2). In fact, the business application 33A, 33B for the business server 4 sequentially reads each of the files to be backed up, which was selected by the user in step SP1 from among the files stored in the primary storage apparatus 8A, from the primary volume PVOL in the primary storage apparatus 8A in accordance with a backup execution command regularly or irregularly issued from the management server 3, sends them to the secondary storage apparatus 8B, and thereby stores the files in the secondary volume SVOL (file-based copying).

Then, the information collecting program 25 for the management server 3 regularly collects information listed below from the control program 55A, 55B for the storage apparatus 8 via the backup management program 32A, 32B for the business server 4 or the copy pair management program 42 for the pair management server 5 and stores the collected information in the differential amount—transfer speed table 61:

(A) the pair names of copy pairs which have been backed up;
(B) the data transfer speed for differential copying between the primary volume PVOL and the secondary volume SVOL;
(C) the data differential amount between the primary volume PVOL and the secondary volume SVOL;
(D) the data transfer speed for file copying between the primary volume PVOL and the secondary volume SVOL; and
(E) the data transfer speed for file copying between the primary volume PVOL and the save volume SAVOL.

Incidentally, the above-mentioned data differential amount "(C)" is the difference in the accumulated amount of data between in the primary volume PVOL and the secondary volume SVOL, which is calculated from the differential rate in the bitmap in the primary storage apparatus or the secondary storage apparatus used for differential copying, and the amount of data in 1 bit of the bitmap table.

After the completion of the backup, the information collecting program 25 for the management server 3 regularly collects the data amount (file size) of individual files stored in the primary volume PVOL and the amount of data updated after the last update via the backup management program 32A, 32B or the copy pair management program 42 from the control program 55A for the primary storage apparatus 8A; and stores the collected data amount and updated data amount of each file in the file information table 60.

Then, if any event in which restoration should be executed occurs, the user operates the client terminal 2 and gives an instruction to execute restoration by designating the files to be restored and the files not to be restored (SP3). As a result, a restoration execution command in response to the above instruction is issued from the client terminal 2 to the management server 3.

After receiving the restoration execution command, the storage management program 23 for the management server 3 (FIG. 1) stores, based on information included in the restoration execution command about objects to be restored and objects not to be restored, "Y" in the corresponding restoration object information column 60F in the file information table 60 if the relevant file is an object to be restored; and the storage management program 23 stores "N" in the corresponding restoration object information column 60F in the file information table 60 if the relevant file is an object not to be restored.

Along with the update of the file information table 60, the storage management program 23 activates the restoration method deciding program 24 (FIG. 1). After the activation, the restoration method deciding program 24 calculates the data transfer time (restoration time) required when each file with "Y" stored in the restoration object information column 60F in the file information table 60 is backed up by the volume-based copying method, the file-based copying method, and the combined copying method respectively, with reference to the file information table 60, the differential amount—transfer speed table 61 (FIG. 9), and the save volume table 62 (FIG. 10). The storage management program 23 decides the restoration method with the shortest data transfer time to be the restoration method to be then executed, based on the above calculation results.

Subsequently, the storage management program 23 gives an instruction to the relevant business server 4 to execute the restoration processing by the restoration method decided as described above. After receiving this instruction (hereinafter referred to as the "restoration execution instruction"), the backup management program 32A, 32B for the business server 4 controls the primary storage apparatus 8A and the secondary storage apparatus 8B to execute restoration of the files to be restored by the restoration method designated by the restoration execution instruction.

(2-4-2) Restoration Method Deciding Processing

Figure 12:
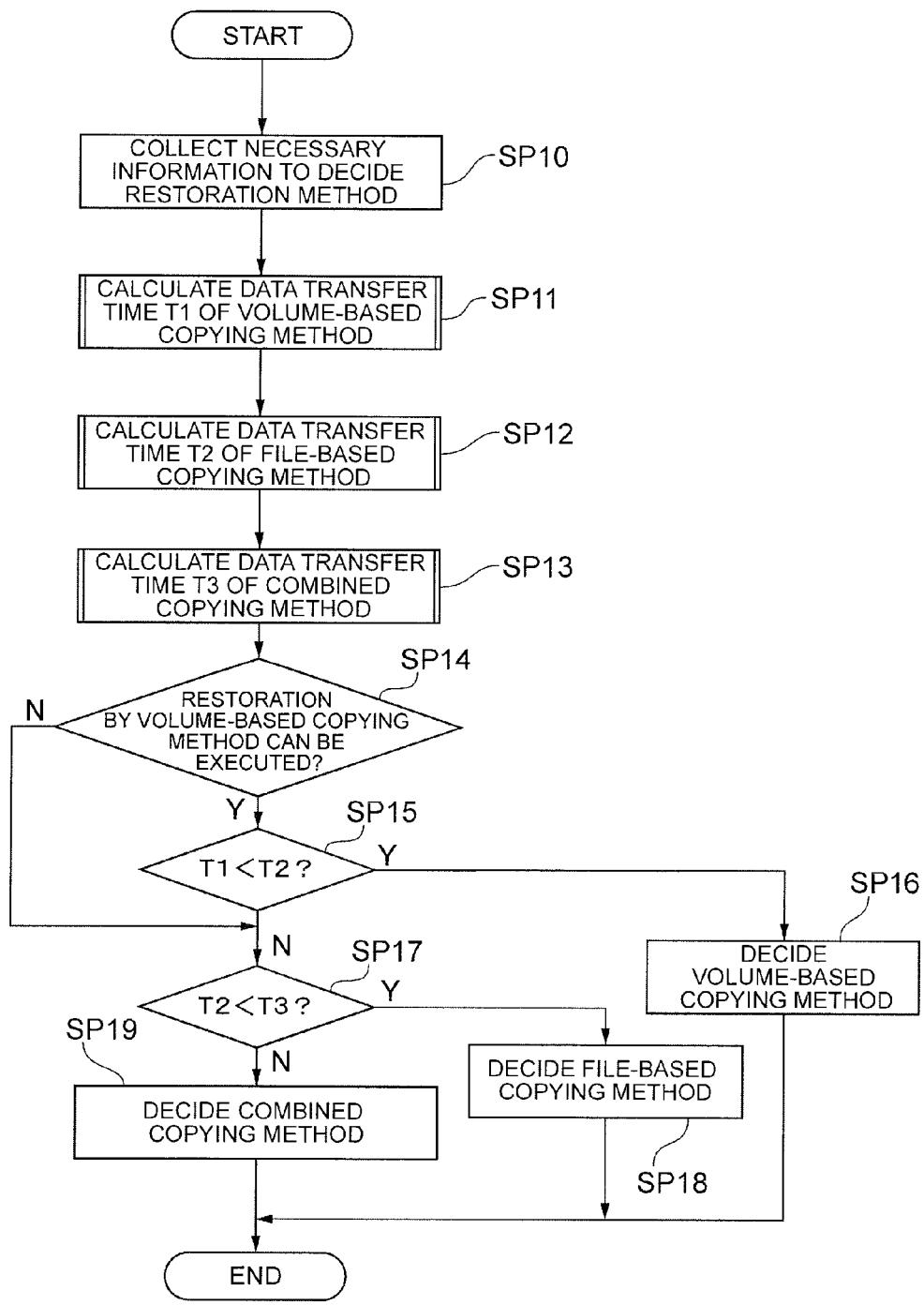
FIG. 12 is a flowchart illustrating a processing sequence for restoration method deciding processing.

FIG. 12 shows a specific processing sequence for restoration method deciding processing executed by the restoration method deciding program 24 in step SP3 of the backup and restoration flow described above with reference to FIG. 11.

After being activated by the storage management program 23, the restoration method deciding program 24 firstly collects the information necessary to calculate the data transfer time for a backup by the volume-based copying method, the file-based copying method, and the combined copying method respectively from, for example, the restoration execution command from the client terminal 2, the file information table 60, the differential amount—transfer speed table 61, and the save volume table 62 (SP10).

Next, the restoration method deciding program 24 sequentially calculates the data transfer time $T_1$ to $T_3$ for a backup by the volume-based copying method, the file-based copying method, and the combined copying method, respectively (SP11 to SP13).

Sequentially, when executing the restoration processing, the restoration method deciding program 224 judges whether or not the restoration processing can be executed by the volume-based copying method (SP14). Specifically speaking, the restoration method deciding program 224 judges whether or not files not to be restored do not exist in the secondary volume SVOL where files to be restored are stored; or if the files not to be restored exist, the restoration method deciding program 224 judges whether or not the differential amount of such files not to be restored is zero (that is, all the files not to be restored have not been updated).

If a negative judgment is returned in step SP14, the restoration method deciding program 24 proceeds to step SP17; and if an affirmative judgment is returned in step SP14, the restoration method deciding program 24 judges whether or not the data transfer time $T_1$ by the volume-based copying method as calculated in step SP11 is shorter than the data transfer time $T_2$ by the file-based copying method as calculated in step SP12 (SP15).

If an affirmative judgment is returned in this step, the restoration method deciding program 24 decides the volume-based copying method to be the restoration method for the restoration processing to be then executed (SP16), notifies the storage management program 23 of the decision result, and then terminates this restoration method deciding processing.

On the other hand, if a negative judgment is returned in step SP15, the restoration method deciding program 24 judges whether or not the data transfer time $T_2$ by the file-based copying method as calculated in step SP11 is shorter than the data transfer time $T_3$ by the combined copying method as calculated in step SP13 (SP17).

If an affirmative judgment is returned in this step, the restoration method deciding program 24 decides the file-based copying method to be the restoration method for the restoration processing to be then executed (SP18), notifies the storage management program 23 of the decision result, and then terminates this restoration method deciding processing.

On the other hand, if a negative judgment is returned in step SP17, the restoration method deciding program 24 decides the combined copying method to be the restoration method for the restoration processing to be then executed (SP19), notifies the storage management program 23 of the decision result, and then terminates this restoration method deciding processing.

(2-4-3) First Data Transfer Time Calculation Processing

Figure 13:
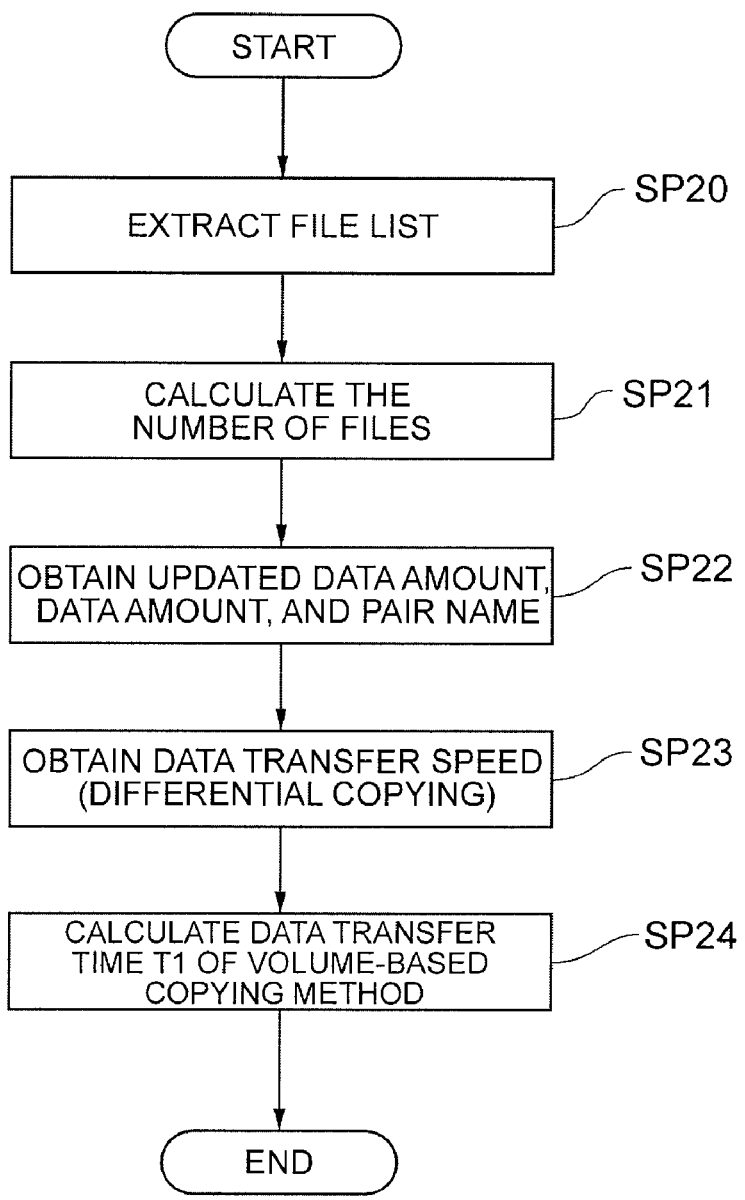
FIG. 13 is a flowchart illustrating a processing sequence for first data transfer time calculation processing.

FIG. 13 shows a processing sequence for first data transfer time calculation processing executed by the restoration method deciding program 24 in step SP11 of the restoration method deciding processing described above with reference to FIG. 12.

When the restoration method deciding program 24 proceeds to step SP11 of the restoration method deciding processing, it starts this first data transfer time calculation processing, firstly refers to the file information table 60, and obtains a list of files which are given the backup IDs designated by the user as the objects to be backed up (hereinafter referred to as the "file list") (SP20).

Next, the restoration method deciding program 24 counts the number of all the files included in the file list obtained in step SP20 (SP21) and obtain the updated data amount, the data amount, and the pair name of a copy pair, whose relevant file is backed up, with respect to each file included in the file list from the file information table 60 (SP22).

Subsequently, the restoration method deciding program 24 obtains the data transfer speed for the copy pair, whose pair name was obtained in step SP22, by the volume-based copying method from the differential amount—transfer speed table 61 (SP23).

Furthermore, the restoration method deciding program 24 calculates the data transfer time (restoration time) when the volume-based copying method is used as the restoration method for the restoration processing to be then executed, according to formula (5) described earlier using each piece of information obtained in step SP20 to step SP21 (SP24). Then, the restoration method deciding program 24 terminates this first data transfer time calculation processing and returns to the restoration method deciding processing.

(2-4-4) Second Data Transfer Time Calculation Processing

Figure 14:
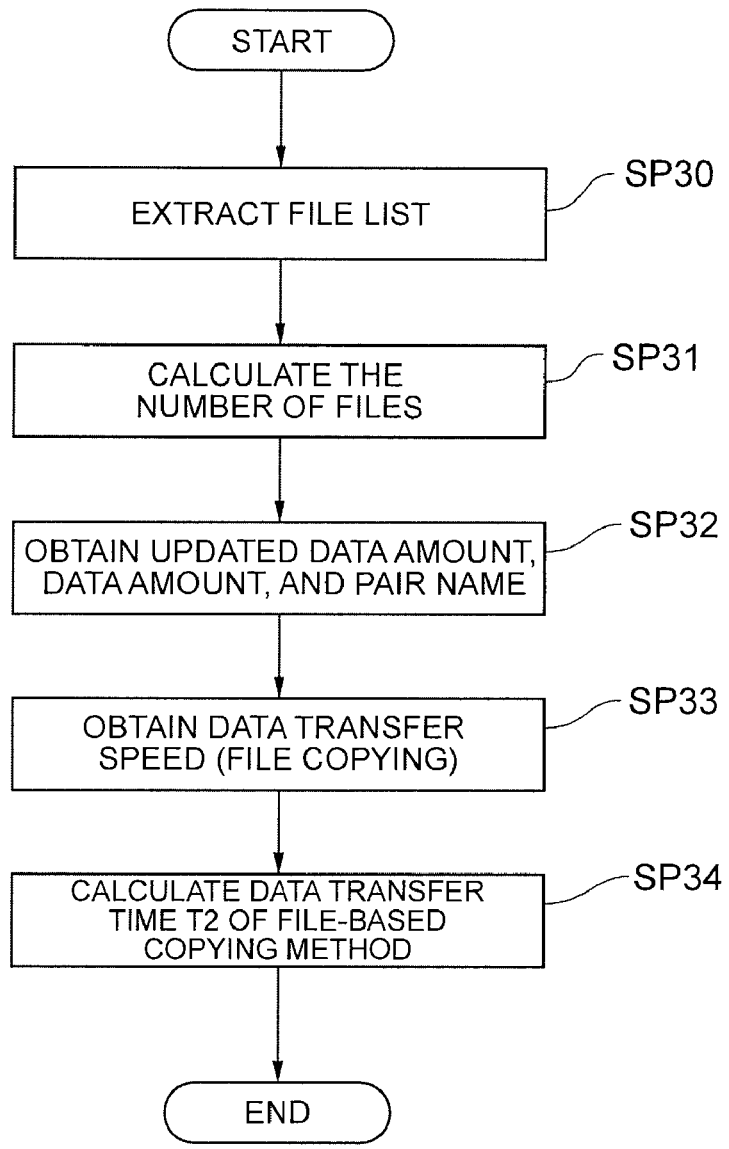
FIG. 14 is a flowchart illustrating a processing sequence for second data transfer time calculation processing.

On the other hand, FIG. 14 shows a processing sequence for second data transfer time calculation processing executed by the restoration method deciding program 24 in step 12 of the restoration method deciding processing described above with reference to FIG. 12.

When the restoration method deciding program 24 proceeds to step SP12 of the restoration method deciding processing, it starts this second data transfer time calculation processing and firstly executes processing in step SP30 to step SP32 in the same manner as in step SP20 to step SP22 of the first data transfer time calculation processing (FIG. 13).

Next, the restoration method deciding program 24 obtains the data transfer speed for the copy pair, whose pair name was obtained in step SP32, by the file-based copying method from the differential amount—transfer speed table 61 (SP33).

Subsequently, the restoration method deciding program 24 calculates the data transfer time (restoration time) when the file-based copying method is used as the restoration method for the restoration processing to be then executed, according to formula (6) described earlier using each piece of information obtained in step SP30 to step SP32 (SP34). Then, the restoration method deciding program 24 terminates this second data transfer time calculation processing and returns to the restoration method deciding processing.

(2-4-5) Third Data Transfer Time Calculation Processing

On the other hand, FIG. 15 shows a processing sequence for third data transfer time calculation processing executed by the restoration method deciding program 24 in step SP13 of the restoration method deciding processing described above with reference to FIG. 12.

When the restoration method deciding program 24 proceeds to step SP13 of the restoration method deciding processing, it starts this third data transfer time calculation processing and firstly executes processing in step SP40 to step SP42 in the same manner as in step SP20 to step SP22 of the first data transfer time calculation processing (FIG. 13).

Next, the restoration method deciding program 24 obtains the data transfer speed for the copy pair, whose pair name was obtained in step SP42, by the volume-based copying method, and the data transfer speed for that copy pair by the file-based copying method between the primary volume PVOL and the save volume SAVOL from the differential amount—transfer speed table 61 (SP43).

Subsequently, the restoration method deciding program 24 calculates the data transfer time (restoration time) when the combined copying method is used as the restoration method for the restoration processing to be then executed, according to formula (6) described earlier using each piece of information obtained in step SP40 to step SP43 (SP44). Then, the restoration method deciding program 24 terminates this third data transfer time calculation processing and returns to the restoration method deciding processing.

(2-5) Specific Example

A specific example of the above-described restoration method deciding processing will be explained with reference to FIG. 17. In this example shown in FIG. 17, the total amount of data to be backed up is 500 [MB], a data transfer speed of differential copying from the primary volume PVOL storing files to be backed up to the secondary volume SVOL is 100 [MB/S], a data transfer speed of file copying from the primary volume PVOL to the secondary volume SVOL is 10 [MB/S], a data transfer speed of file copying from the primary volume PVOL to the save volume SAVOL is 10 [MB/S], and a data update rate of each file to be backed up (differential rate) is 100 [%].

FIG. 17 shows a list of the data transfer time $T_1$ to $T_3$ by each restoration method when the total data amount of files to be restored is "400 MB", "100 MB", "500 MB," and "0MB."

As is apparent from FIG. 17, when the total data amount of the files to be restored is "400 MB," files not to be restored exist in the primary volume PVOL and the secondary volume SVOL, so that the volume-based copying method cannot be used as the restoration method. Under the above-described condition, data transfer time by the file-based copying method is "40" seconds and data transfer time by the combined copying method is "24" seconds. Therefore, in this case, the combined copying method is selected as the restoration method.

When the total data amount of the files to be restored is "100 MB," the volume-based copying method cannot be used as the restoration method. Under this condition, the data transfer time by the file-based copying method is "10" seconds and the data transfer time by the combined copying method is "81" seconds. Therefore, in this case, the file-based copying method is selected as the restoration method.

On the other hand, if the total data amount of the files to be restored is "500 MB," it means that no files not to be restored exist and all the files are designated as objects to be restored. Under such a condition, the data transfer time by the volume-based copying method is "5" seconds; the data transfer time by the file-based copying method is "50" seconds; and the data transfer time by the combined copying method is "5" seconds, the same data transfer time as that of the volume-based copying method because no files not to be restored exist. Therefore, in this case, the volume-based copying method is selected as the restoration method.

On the other hand, if the total data amount of the files to be restored is "0 MB," it means that no files to be restored exist and all the files are not to be restored. Therefore, in this case, the restoration processing will not be executed.

(3) Advantageous Effects of This Embodiment

With the computer system 1 according to this embodiment as described above, the restoration method deciding information such as the data transfer speed for differential copying between the primary volume and the secondary volume, the data transfer speed for file copying between the primary volume and the secondary volume, and the data transfer speed for filing copying between the primary volume and the save volume is collected in advance; and when the restoration processing is executed, the restoration method with the fastest data transfer speed (restoration time) is selected and decided based on the collected restoration method deciding information. Therefore, the user does not have to judge which restoration method should be used to restore data when executing the restoration, so that it is possible to save time and effort for making such a judgment. As a result, it is possible to facilitate restoration work.

(4) Other Embodiments

The aforementioned embodiment has described the case where this invention is applied to the computer system configured as shown in FIG. 1. However, this invention is not limited to this example and can be applied to a wide variety of computer systems having various configurations.

Moreover, the aforementioned embodiment has described the case where the computer system 1 can execute three restoration methods, that is, the volume-based copying method, the file-based copying method, and the combined copying method. However, this invention is not limited to this example and can be applied to a case where the computer system 1 can execute the restoration processing by another restoration method in addition to or instead of the above-mentioned three restoration methods.

Furthermore, the aforementioned embodiment has described the case where the data transfer time $T_1$ to $T_3$ by the volume-based copying method, the file-based copying method, and the combined copying method is calculated by formulas (5) to (7). However, this invention is not limited to this example and the data transfer time $T_1$ to $T_3$ may be calculated using other arithmetic expressions.

Furthermore, the aforementioned embodiment has described the case where the primary volume PVOL and the secondary volume SVOL are provided in different storage apparatuses (the primary storage apparatus 8A and the secondary storage apparatus 8B) and so-called remote copying is performed between the primary volume PVOL and the secondary volume SVOL. However, this invention is not limited to this example and can be also applied to a case where, for example, the primary volume PVOL and the secondary volume SVOL exist in the same storage apparatus and so-called local copying is performed between the primary volume PVOL and the secondary volume SVOL.

This invention can be applied to a wide variety of computer systems capable of restoring data by a plurality of types of restoration methods.

What is claimed is:

1. A computer system with a primary volume, from or to which a business server reads or writes data, and a secondary volume configured to back up data written to the primary volume, wherein the primary and secondary volumes are provided in a same storage apparatus or different storage apparatuses, the computer system comprising a management server configured to manage data backup and restoration between the primary volume and the secondary volume, wherein the management server includes:

an information collecting unit configured to collect information from at least the business server, the storage apparatus with the primary volume formed therein, and the same or different storage apparatus with the secondary volume formed therein;

a restoration deciding unit configured, in response to a restoration request received externally, to calculate time needed to execute restoration processing on a volume basis, time needed to execute restoration processing on a file basis, and time needed to execute restoration processing with a combination of the volume basis and the file basis based on the information collected by the information collecting unit, and to decide a restoration approach with a shortest restoration time for the restoration processing to be executed in response to the restoration request; and a storage management unit configured to notify the business server of the restoration approach decided by the restoration deciding unit;

wherein the business server is configured to control the storage apparatus with the primary volume formed therein and the same or different storage apparatus with the secondary volume formed therein such that the restoration processing will be executed by the restoration approach of which the business server has been notified by the storage management unit.

2. The computer system according to claim 1, wherein the restoration approach is one of a plurality of types of predetermined restoration approaches including:

a first restoration approach of differential copying of data stored in the secondary volume to the primary volume on a volume basis;

a second restoration approach of copying data of a file to be restored in the secondary volume to the primary volume on a file basis; and a third restoration approach of temporarily saving data of a file, which is stored in the primary volume and is not to be restored, in a save volume provided in the same storage apparatus as that of the primary volume or provided outside that storage apparatus, copying data stored in the secondary volume to the primary volume on a volume basis, and then returning the data of a file, which is not to be restored and has been saved in the save volume, to the primary volume.

3. The computer system according to claim 1, wherein the collected information comprise a first data transfer speed for differential copying between the primary volume and the secondary volume, a second data transfer speed for file copying between the primary volume and the secondary volume, a third data transfer speed for file copying between the primary volume and the save volume, file size of individual files backed up to the secondary volume, and an updated data amount of the individual files.

4. A method of deciding a restoration approach for a computer system with a primary volume, from or to which a business server reads or writes data, and a secondary volume for backing up data written to the primary volume, wherein the primary and secondary volumes are provided in a same storage apparatus or different storage apparatuses, the computer system including a management server configured to manage a data backup and restoration between the primary volume and the secondary volume, the method comprising:

collecting, using the management server, information from at least the business server, the storage apparatus with the primary volume formed therein, and the same or different storage apparatus with the secondary volume formed therein;

calculating, using the management server in response to a restoration request received externally, time needed to execute restoration processing on a volume basis, time needed to execute restoration processing on a file basis, and time needed to execute restoration processing with a combination of the volume basis and the file basis based on the collected information, and deciding a restoration approach with the shortest restoration time for the restoration processing to be executed in response to the restoration request;

notifying, using the management server, the business server of the decided restoration approach; and controlling, using the business server, the storage apparatus with the primary volume formed therein and the same or different storage apparatus with the secondary volume formed therein such that the restoration processing will be executed by the restoration approach of which the business server has been notified by the management server.

5. The restoration method according to claim 4, wherein the restoration approach is one of a plurality of types of predetermined restoration approaches including:

a first restoration approach of differential copying of data stored in the secondary volume to the primary volume on a volume basis;

a second restoration approach of copying data of a file to be restored in the secondary volume to the primary volume on a file basis; and a third restoration approach of temporarily saving data of a file, which is stored in the primary volume and is not to be restored, in a save volume provided in the same storage apparatus as that of the primary volume or provided outside that storage apparatus, copying data stored in the secondary volume to the primary volume on a volume basis, and then returning the data of a file, which is not to be restored and has been saved in the save volume, to the primary volume.

6. The restoration method according to claim 4, wherein the collected information comprise a first data transfer speed for differential copying between the primary volume and the secondary volume, a second data transfer speed for file copying between the primary volume and the secondary volume, a third data transfer speed for file copying between the primary volume and the save volume, file size of individual files backed up to the secondary volume, and an updated data amount of the individual files.

* * * * *